United States Patent [19]

Rubio

[11] 4,250,802
[45] Feb. 17, 1981

[54] APPARATUS FOR CONVERTING GRAIN INTO DOUGH

[76] Inventor: Manuel J. Rubio, 192 Benham Ave., Bridgeport, Conn. 06605

[21] Appl. No.: 22,787

[22] Filed: Mar. 22, 1979

[51] Int. Cl.³ .................... A47J 27/00; A23L 1/00
[52] U.S. Cl. .................................. 99/348; 99/353;
99/443 C; 241/8; 426/622; 426/626
[58] Field of Search .............. 426/481, 439, 508, 518,
426/516, 622, 626; 241/6, 7, 8, 9; 99/348, 352,
353, 443 C

[56] References Cited

U.S. PATENT DOCUMENTS

| Re. 26,263 | 9/1967 | Madrazo | 426/626 |
|---|---|---|---|
| 1,262,144 | 4/1918 | Villegas | 426/622 |
| 1,268,860 | 6/1918 | Lara | 426/622 |
| 1,334,366 | 3/1920 | Garza | 426/622 |
| 2,584,893 | 2/1952 | Lloyd | 426/622 |
| 2,704,257 | 3/1955 | Sollano | 426/626 X |
| 3,194,664 | 7/1965 | Eytinge | 426/626 |
| 3,369,908 | 2/1968 | Gonzalez | 426/622 |
| 3,574,636 | 4/1971 | Rozsa | 426/622 |
| 3,773,520 | 11/1973 | Longenecker | 99/353 X |
| 3,985,070 | 10/1976 | Longenecker | 99/353 |

Primary Examiner—Billy J. Wilhite
Attorney, Agent, or Firm—William G. Rhines

[57] ABSTRACT

This invention relates to methods and apparatus for processing grain, such as corn, into flour and dough useful in making foodstuff products, such as tacos, tortillas, corn chips, etc. In one embodiment, atmospheric pre-heating of the grain with consequent cracking of the hull is combined with the softening effects of a lime water spray to deliver partially cooled grain in a comparatively dry state to a mill for efficient pulverization, following which it is made into a dough which is finally cooked and formed into the desired end product.

4 Claims, 1 Drawing Figure

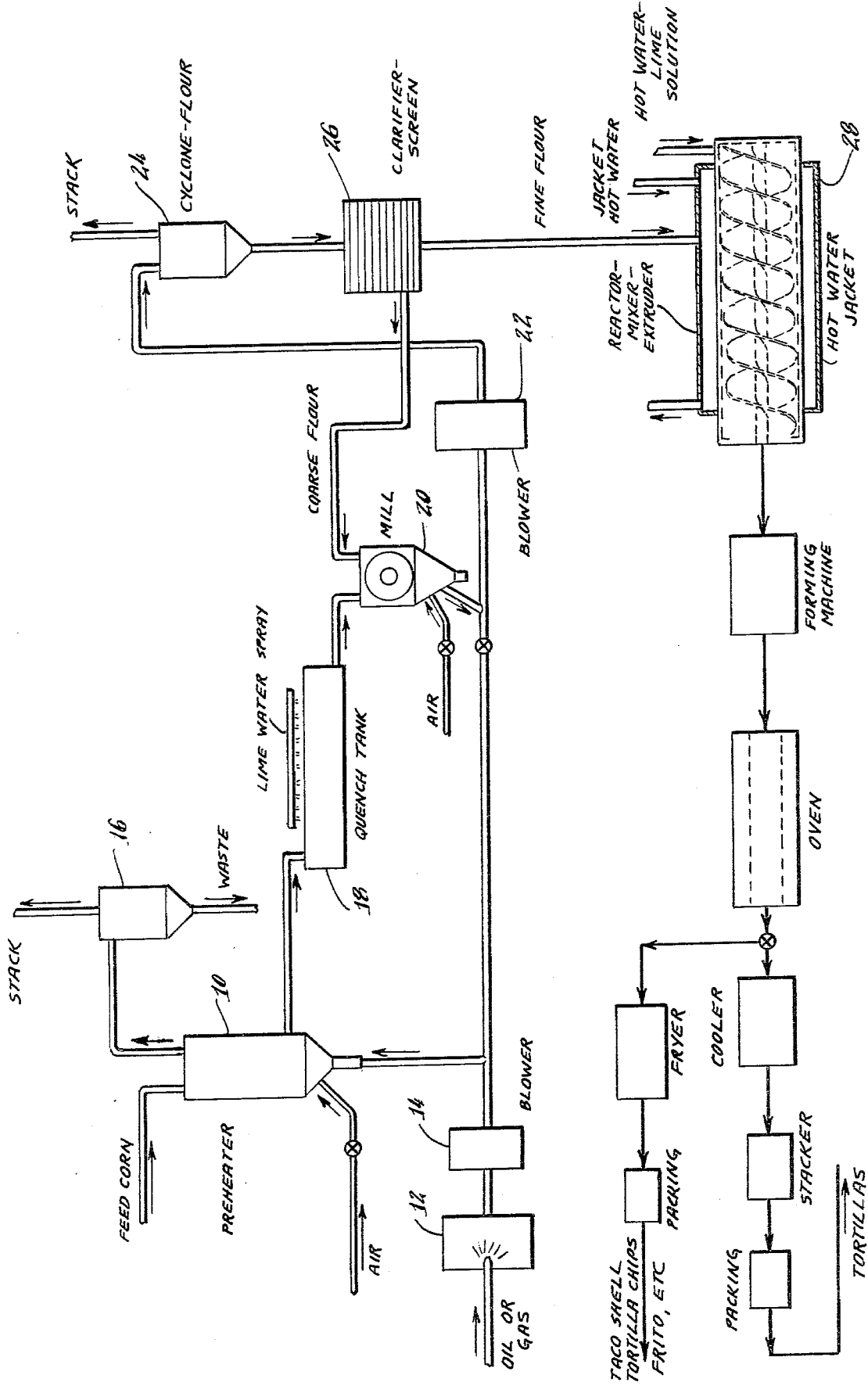

APPARATUS FOR CONVERTING GRAIN INTO DOUGH

BACKGROUND OF INVENTION

In the field of food processing, it is known to grind grain, such as corn, into flour, which may then be made into dough to produce end products such as taco shells, tortillas, fritos, chips, etc. In this connection, reference is made to the following U.S. Pat. Nos.: Villegas 1,262,144; deLara 1,268,860; Garza 1,334,366; Lloyd et al 2,584,893; de Sollano et al 2,704,257; Eytinge 3,194,664; Madrazo et al Re. 26,263; Gonzalez et al 3,369,908; Longenecker et al 3,773,520; and Longenecker et al 3,985,070. The prior art methods and apparatus for making such flour and dough typically have involved the cooking of grain under controlled conditions so as to render it susceptible to milling. As such, relatively large amounts of water and long cooking times were utilized because of the difficulties attendent rendering the grain into suitable physical condition for further processing. The necessity of having to use such large amounts of water results in undesirable inefficiencies in the grinding process and raised costs for water removal, as well as a loss of valuable solids in the cooking water. Accordingly, it is an object of this invention to provide a means for rendering grain, such as corn, into flour and/or dough, under processing conditions involving reduced amounts of water, and a shortened processing time.

It is a further object of this invention to provide such means wherein such grain may be so processed directly in the form of the desired end product.

SUMMARY OF INVENTION

Desired objectives may be achieved through practice of the prent invention involving improved methods and apparatus for processing grain into flour and/or dough, embodiments of which include dry pre-heating of the grain so as to effect thermal cracking of the grain hulls and moisture removal, quenching the grain in lime-water to further reduce the grain hulls, and to stabilize the moisture content to a desired optimum level for grinding, grinding the grain, separating the flour produced by gringing into particle size categories, mixing the flour into dough and completing the cooking process while in the form of dough, and forming the dough so cooked into the desired end form, such as a taco shell, tortilla, frito, or the like.

DESCRIPTION OF DRAWINGS

This invention may be understood from the description which follows and from the accompanying drawings in which FIG. 1 is a schematic representation of an embodiment of this invention.

DESCRIPTION OF PREFERRED EMBODIMENTS

Referring to FIG. 1, there is depicted apparatus which embodies the present invention. Corn is fed into a pre-heater 10 into which heat is introduced from a furnace 12 preferably having an auxiliary blower 14. By this means, the corn may be heated to a temperature of 135° C.–150° C. in approximately 12–18 minutes, causing the moisture content of the corn to be reduced while inducing surface cracks in the grain shells that subsequently aid in the introduction of water into the grain. At the same time, impurities are removed from the corn and are collected in a cyclone collector 16 of known per se design. The heated corn is then passed to a quech tank 18 where it is sprayed with lime-bearing water which the corn absorbs rapidly while acquiring a high lime content as it is moved through the quech tank by a screw conveyor during 5–15 minutes. The attendant introduction of calcium hydroxide into the grain and modification of the structure of the hull and its permeability to water improves the water absorption of the kernels. By this means, the moisture content of the grain may reach 18–27%. This is an optimum moisture level because, on the one hand, the grain is hard enough to be ground more efficiently than higher moisture content, more plastic grain, while, on the other hand, being sufficiently plastic to avoid the excess accumulation of "fines", dust, or other particles which are too fine to be used efficiently in the making of flour suitable to produce things such as taco shells, tortillas, or fritos of substantially uniform particle size. The corn so treated is transferred to a milling machine 20, such as a grain hammer mill, where it is ground.

It is to be emphasized that the ability to control the moisture content in the range between about 18% and about 27%, and preferably between about 20% and 27%, through practice of this invention, is very significant technically and commercially. Through such control of moisture, the size of the particle produced may be controlled so as to optimize it for the end product that is desired to be produced. For example, taco shells should be made from rather coarse grain to avoid "blowing" and blistering of the product during the subsequent frying phase of processing. Generally speaking, the dryer the grain kernels are at the time of grinding, the coarser the resulting kernels will be. On the other hand, a moisture content of 45–46% is usual for "oven paste", i.e., the mixture of corn flour and water that is usually formed into the desired end product and subjected to cooking. However, in a continuous process, such as the one herein contemplated, such a high moisture content at the milling stage would render the grinding process very inefficient. Even if the grain kernels were milled first at a very low moisture content (say, in the range of about 2%), in the interests of improving efficiency, the end result would be substantially undesirable since a very large percentage of "fines" in the form of dust would be generated. Thus, it will be seen, that through practice of the present invention, it is possible at once to integrate the milling phase into a continuous process while, at the same time, ensuring maximum efficiency and particle size at the milling stage.

Thereafter, the grain particles are sucked by a blower 22 which also sucks in atmospheric air and air which has been preheated by the furnace 12, which causes the moisture content of the ground grain to be adjusted to about 16%, depending on the granulation being produced. The adjustment of moisture takes place almost instantaneously while the grain passes to a cyclone separator 24, where it is prepared, with established moisture content, for classification in any appropriate device, such as a mesh screen separator 26. For example, flour of 55–60 mesh maximum may be used to produce flour for tortillas, while flour of 25–30 mesh maximum may be used for taco shells, tortilla chips, or fritos. Particles which are coarser than those needed for the end product which is ultimately produced are returned to the milling machine 20 for further processing, while finer flour is fed into a reactor 28 where it is completely nixtamalized and converted into a corn dough.

Up to this point the grain has been both cleaned and conditioned; the latter process being to hydrolize the hull with the introduction of lime water to the starch constituent of the grain. This also serves to subdivide the grain and to regulate the size of the granules.

In the reactor 28, the starch constituents of the granules are gelatinized and the grain made homogeneous as a preparation for final regulation of the "pH" or degree of alkalinity of the dough, so that, under controlled temperature, it can be made to have desirable flavor. The temperature is imparted via the water which is added and/or via the reactor jacket, since it is a cylinder with a jacket to hold water or steam, at about 8 pounds per square inch. In the interior, it has a shaft with bolts, blades, fins, or spiral sections to produce an extruder-like motion from the feed end to the discharge end while the dough is being cooked; the shaft and extrusion speed being variable to produce an exposure time of anywhere from ½ to 4 minutes, depending upon the material being processed, with very gentle action so that the dough is "worked" as little as possible so as to avoid it becoming too plastic or sticky. The discharge end of the reactor 28 has a screw extruder capable of developing pressures in the range of 20-60 pounds per square inch, to discharge the dough in varying shapes or forms for cooking into tortillas, taco shells, tortilla chips, fritos, or other products.

Thus, with this apparatus, it is possible to integrate into a continuous process the production of these types of materials into a single unified production line, from raw grain to finished shelf goods.

Further, from the foregoing, it will be clear that the processing of grain into flour and dough in accordance with this invention is much more efficiently carried out because of the reduced use of water, which makes the grinding process more efficient, and avoids the costs and difficulties of removing the water that would have been present but for the features of this invention, along with time inefficiencies and solids losses.

It is to be understood that the embodiments of this invention herein discussed and illustrated are by way of illustration and not of limitation, and that other embodiments may be made by those skilled in the arts without departing from the spirit or scope of this invention.

I claim:

1. Apparatus for converting grain into dough comprising
    a pre-heater for quickly heating grain while in the unwetted state,
    a quench tank for spraying grain passing from said pre-heater with liquid of pre-established chemical characteristics,
    transfer means for causing grain to pass from said pre-heater to said quench tank,
    a mill for crushing grain coming from said quench tank into particles,
    transfer means for causing grain to pass from said quench tank to said mill,
    a classifier for segregating grain particles coming from said quench tank according to pre-established particle size criteria,
    transfer means for causing grain particles to pass from said mill to said classifier,
    mixing means for mixing said particles with liquid of pre-established chemical characteristics to form a dough, heat means for applying cooking heat to said dough, and extruder means for extruding said dough,
    and transfer means for causing said particles to pass from said classifier to said mixing means.

2. The apparatus of claim 1 wherein said mixing means, said heating means, and said extruder means comprise an externally heated, screw type extruder.

3. The apparatus of either claims 1 or 2 including forming means for forming dough coming to it into desired end-product shapes.

4. The apparatus of either claims 1 or 2 including forming means for forming dough coming to it into end-products of desired shapes, and means for further cooking and packaging said end products.